US008516987B2

(12) United States Patent
Boyes et al.

(10) Patent No.: US 8,516,987 B2
(45) Date of Patent: Aug. 27, 2013

(54) INTAKE MANIFOLD HAVING RUNNERS WITH VARIABLE CROSS SECTIONAL AREA

(75) Inventors: Andrew Boyes, Aurora (CA); Alvin Hong Mo Cheung, Richmond Hill (CA); Rares I. Cosma, Oakville (CA); Nikolaus Spyra, Ruhpolding (DE)

(73) Assignee: Litens Automotive Partnership, Woodbridge (CA)

( * ) Notice: Subject to any disclaimer, the term of this patent is extended or adjusted under 35 U.S.C. 154(b) by 810 days.

(21) Appl. No.: 12/066,392

(22) PCT Filed: Sep. 14, 2006

(86) PCT No.: PCT/CA2006/001509
§ 371 (c)(1),
(2), (4) Date: Mar. 11, 2008

(87) PCT Pub. No.: WO2007/030933
PCT Pub. Date: Mar. 22, 2007

(65) Prior Publication Data
US 2008/0210189 A1 Sep. 4, 2008

Related U.S. Application Data

(60) Provisional application No. 60/717,342, filed on Sep. 15, 2005.

(51) Int. Cl.
*F02M 35/10* (2006.01)
(52) U.S. Cl.
USPC ............................ 123/184.56; 123/184.53
(58) Field of Classification Search
USPC ................... 123/184.21–184.61, 306, 308
See application file for complete search history.

(56) References Cited

U.S. PATENT DOCUMENTS

| 2,894,497 | A | * | 7/1959 | Bolles, Jr. ............... 123/184.31 |
| 4,274,368 | A | | 6/1981 | Shaffer |
| 4,977,866 | A | | 12/1990 | Wilkins |
| 5,211,139 | A | | 5/1993 | Houle et al. |
| 5,311,848 | A | | 5/1994 | Isaka et al. |
| 5,662,086 | A | | 9/1997 | Piccinini |
| 5,687,684 | A | | 11/1997 | Verkleeren |
| 5,762,036 | A | * | 6/1998 | Verkleeren ............... 123/184.31 |
| 6,105,545 | A | | 8/2000 | Breidenbach |
| 6,135,418 | A | * | 10/2000 | Hatton ......................... 251/306 |
| 7,072,473 | B2 | * | 7/2006 | Foth ............................ 380/243 |
| 2002/0088423 | A1 | * | 7/2002 | Minegishi et al. ....... 123/184.55 |
| 2002/0124829 | A1 | | 9/2002 | Schweinzer et al. |
| 2005/0028778 | A1 | | 2/2005 | Boyes |

FOREIGN PATENT DOCUMENTS

| EP | 0212834 B1 | 3/1987 |
| EP | 0724684 B1 | 11/1997 |

* cited by examiner

*Primary Examiner* — Noah Kamen
*Assistant Examiner* — Hung Q Nguyen

(57) ABSTRACT

The present invention provides a tunable engine manifold which employs sliders to form one wall of the inlet runners. The sliders can be moved to alter the cross sectional area of the runners as desired. Seals on the sliders provide an efficient means to seal the runners to prevent undesired leaks within runners and, while not required by the present invention, the overmolding of the seals onto the sliders provides a cost effective and mechanically effective manner of providing the desired seals between the inlet runners and the sliders. The tunable engine manifold can be an inlet or an exhaust manifold and can provide a crossover between the banks of inlet runners, or between individual runners, to control resonance in the manifold.

19 Claims, 11 Drawing Sheets

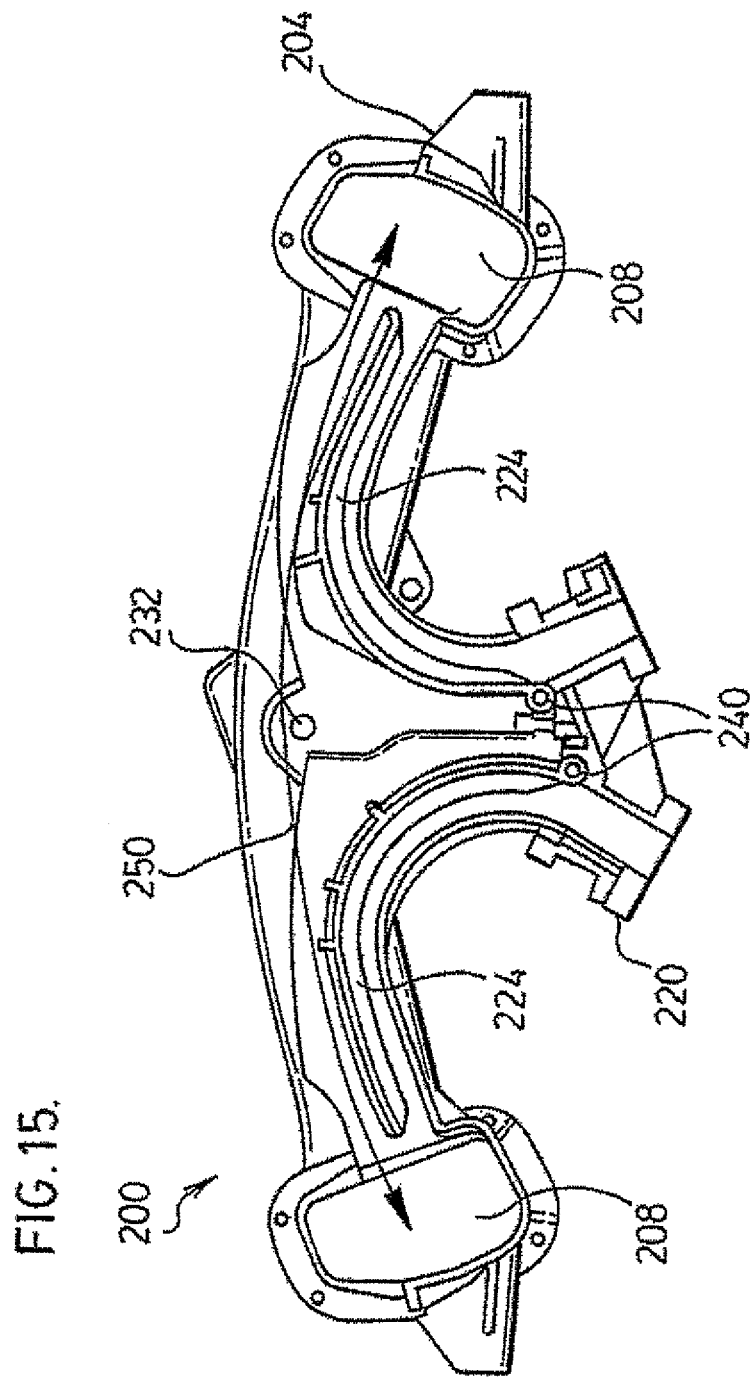

INTAKE MANIFOLD HAVING RUNNERS WITH VARIABLE CROSS SECTIONAL AREA

CROSS-REFERENCE TO RELATED APPLICATIONS

This application is a 371 of PCT/CA2006/01509 filed Sep. 14, 2006, which claims the benefit of U.S. Provisional No. 60/717,342 filed Sep. 15, 2005.

FIELD OF THE INVENTION

The present invention relates to an engine manifold for an internal combustion engine. More specifically, the present invention relates to an engine manifold wherein at least a portion of the cross sectional area of the manifold runners can be varied.

BACKGROUND OF THE INVENTION

Manifolds are used to introduce air and/or fuel/air mixtures to the cylinders of internal combustion engines and to remove exhaust gases from those same cylinders. Intake manifolds generally take air from a plenum, which can be integrally formed with the manifold or attached thereto, and direct the air through a set of runners in the manifold to the individual cylinders where it is received and used in combustion. Exhaust manifolds receive exhaust gases from the cylinders and direct those gases through runners to a collector piece which merges the flows from individual runners into one or more exhaust pipes.

The geometry and arrangement of the runners in the intake and/or exhaust manifolds dictate how efficient the transportation of the air into, and exhaust gases out of, the cylinders of the internal combustion engine is and thus how efficient the engine itself is. The length, shape and the cross-sectional area of the runners directly affect the pressure and velocity at which the air reaches the cylinders and thus the amount of the mixture of air and fuel which is combusted in the cylinders. Similarly, length, shape and the cross-sectional area of the runners directly affect the removal and/or scavenging of exhaust gases from the cylinders.

Generally, the design of the runners is made for maximum performance of the internal combustion engine at a specific engine operating speed. While very good performance can be obtained at the selected specific speed with a good design, compromises in performance are made at every other speed at which the internal combustion engine operates.

There is a desire to have manifolds which reduce the compromises which must otherwise be made in engine manifold designs.

Prior attempts to reduce design compromises have included U.S. Pat. No. 4,210,107 to Shaffer which discloses a tunable intake manifold. The intake manifold includes a plurality of runners, each having a side wall that is adjustable along the length of each of the runner. Specifically, the side walls can be moved transversely, inwardly and outwardly, with respect to the flow direction of the air throughout the runners to decrease or increase the cross-sectional area of the runner presented to the airflow.

While such an adjustable side wall can adjust the cross-sectional area of each of the runners to tune the inlet manifold, the side wall creates a space between the side wall and the side of the runner that the side wall has moved away from. This unused volume is not sealed and receives portions of the air as it passes thereby, which reduces the effectiveness of the manifold and creates inefficiencies in the runners. In addition, these spaces may induce unwanted turbulence in the runners, negating some or all the performance improvement obtained by tuning the manifold.

Further, the system taught by Shaffer would be costly and difficult to manufacture and would require a greater volume of space for the inlet manifold in the engine compartment than would a conventional manifold and such a larger required volume is often unavailable.

SUMMARY OF THE INVENTION

It is an object of the present invention to provide a novel engine manifold which obviates or mitigates at least one disadvantage of the prior art.

According to a first aspect of the present invention, there is provided a tunable engine manifold for connecting to an internal combustion engine, comprising: a set of runners, each runner connecting to a port of a cylinder of the engine; a set of sliders, each slider being pivotally mounted within a respective one of the runners such that movement of the slider about the pivot alters the cross sectional area of the runner; and a slide actuator being operable to pivot the sliders within the runners.

According to another aspect of the present invention, there is provided a tunable inlet manifold for an internal combustion engine, comprising: a first manifold member including a manifold mounting flange to connect the manifold to the inlet ports of an engine; an air plenum; a second manifold member forming three sides of an inlet runner to extend from the air plenum to manifold mounting flange; a slider actuator; a set of sliders, each respective slider acting as a respective fourth wall to form inlet runners with a respective inlet runner, the sliders being moveable by the slider actuator to alter the cross sectional area of the inlet runners.

According to yet another aspect of the present invention, there is provided a slider assembly for a tunable engine manifold, comprising: a mounting member for mounting the assembly to an engine manifold, a set of sliders pivotally attached to the assembly, each slider forming one wall of a respective runners of the manifold such that pivotal movement of the sliders alters the area of the runners; a slider actuator connected to the sliders such that movement of the slider actuator pivots the sliders in the runners; and an actuator to move the slider actuator.

The present invention provides a tunable engine manifold which can be manufactured in a cost effective manner and which makes efficient use of its volumetric area. Sliders which form one wall of the runners can be moved to alter the cross sectional area of the runners as desired. Seals on the sliders seal the runners to prevent undesired leaks within runners and, while not required by the present invention, the overmolding of the seals onto the sliders provides a cost effective and mechanically effective manner of providing the desired seals between the inlet runners and the sliders. The manifold can be constructed and employed as an inlet manifold, or as an exhaust manifold and an engine can be equipped with either or both manifolds.

BRIEF DESCRIPTION OF THE DRAWINGS

Preferred embodiments of the present invention will now be described, by way of example only, with reference to the attached Figures, wherein:

FIG. 8 shows a cross section of a slider and runner of the manifold of FIG. 1 with the slider in the maximum open position of FIG. 2a;

FIG. 15 shows a cross section taken along line 15-15 of FIG. 12.

DETAILED DESCRIPTION OF THE INVENTION

Figure 1:
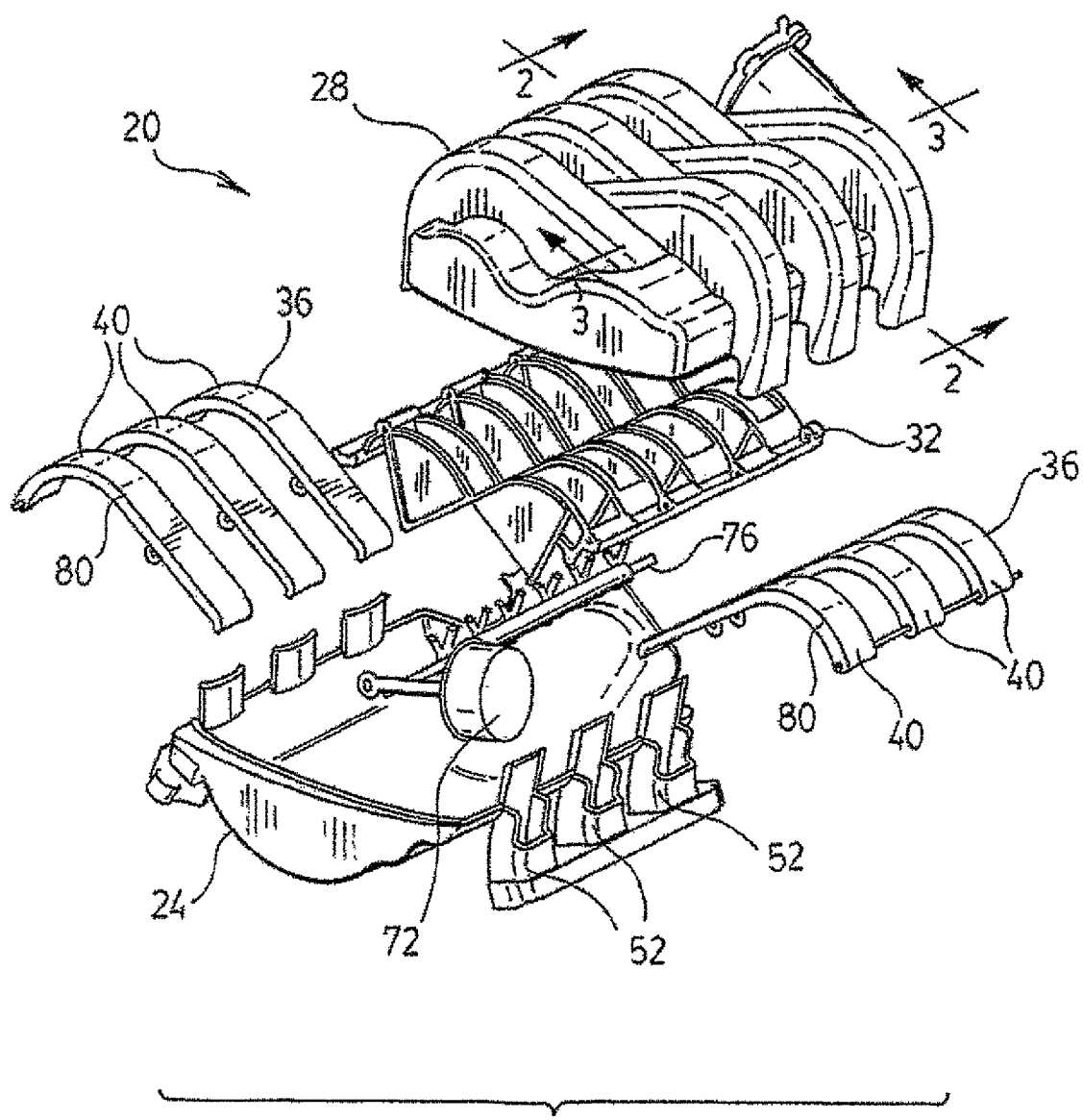
FIG. 1 shows an exploded perspective view of an inlet manifold in accordance with the present invention.

An intake manifold in accordance with the present invention is indicated generally at 20 in FIG. 1. Manifold 20 comprises a lower manifold member 24, an upper manifold member 28, an intermediate member 32 and a pair of slider assemblies 36. In the illustrated embodiment, upper manifold member 28, intermediate member 32 and lower manifold member 24 are molded from an engineering thermoplastic material, such as glass reinforced polyamide which assists in the cost efficient manufacture of manifold 20 and which reduces the weight of manifold 20.

However, as will be apparent to those of skill in the art, one or more of upper manifold member 28, intermediate member 32 and lower manifold member 24 can be fabricated from other polymer materials or metals, such as aluminum or magnesium alloys, if desired. It is also contemplated that different materials can be used to fabricate different ones of upper manifold member 28, intermediate member 32 and lower manifold member 24, for example with upper manifold member 28 being fabricated from glass reinforced polyamide and lower manifold member 24 being fabricated from aluminum.

In the illustrated embodiment, manifold 20 is designed for a ninety degree V-6 engine and thus manifold 20 is intended to be located between the cylinder banks and each slider assembly 36 comprises three sliders 40, one for each cylinder in a bank. However, as will be apparent to those of skill in the art, the number of sliders 40 in a slider assembly 36 can be varied, as needed, to correspond to the number of cylinders and/or the shape and volume of manifold 20 can be changed to correspond to the configuration of a particular engine, such as sixty degree V designs, inline and/or opposed configurations, etc.

Figure 2A:
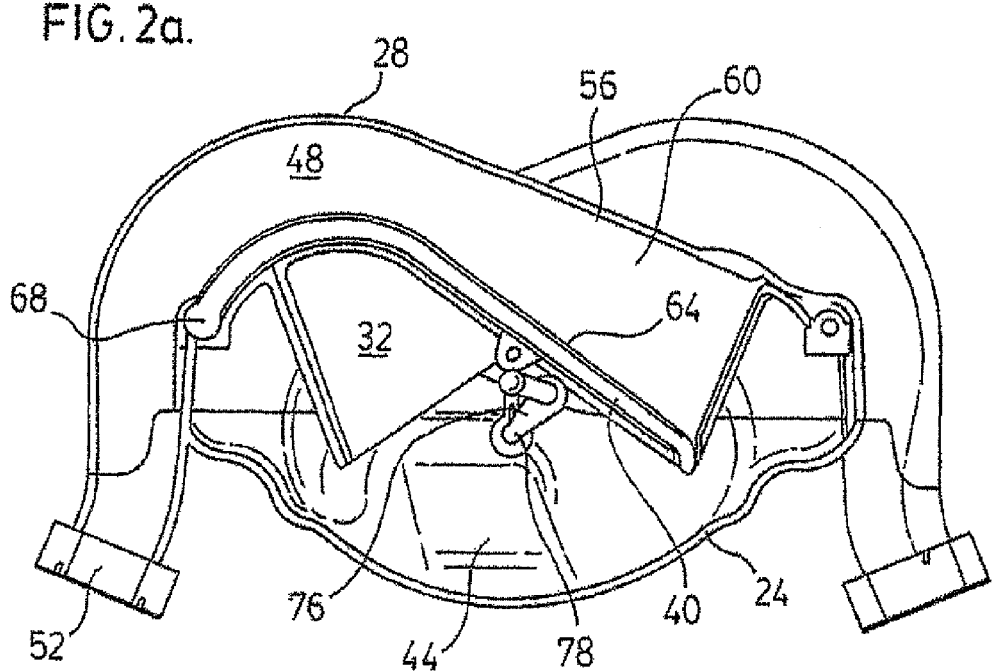
FIGS. 2a and 2b are a cross section, taken through line 2-2 of FIG. 1, showing a slider of the manifold in a maximum open position and a minimally open position respectively.
Figure 2B:
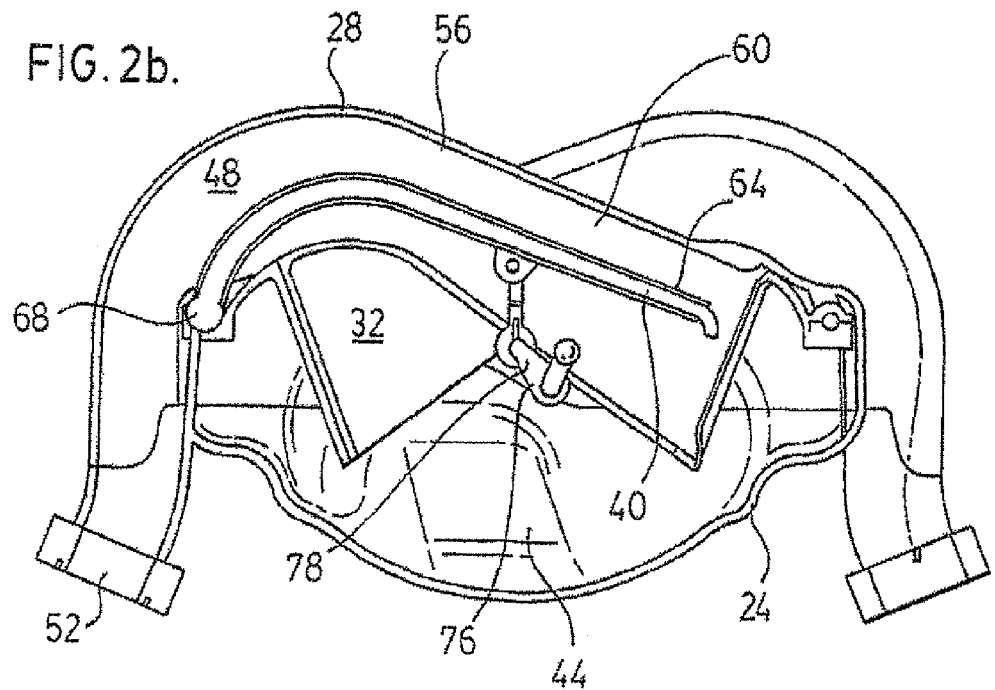
Figure 3:
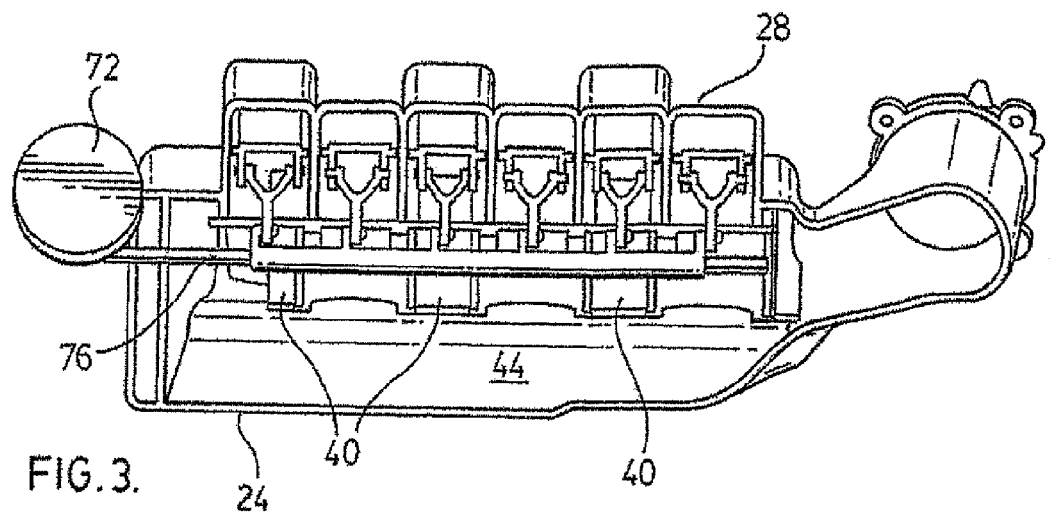
FIG. 3 is a cross section, taken through line 3-3 of FIG. 1, showing the slider actuating mechanism of the manifold.

FIGS. 2a, 2b and 3 show cross sections through manifold 20. As shown, lower manifold member 24 includes a portion which serves as a plenum 44 from which the runners 48 formed in upper manifold member 28 smoothly extend to manifold mounting flanges 52, formed in lower manifold member 24, to attach directly, or indirectly, to the respective engine head inlet ports (not shown). While in the illustrated embodiment plenum 44 is formed primarily by lower manifold member 24, the present invention is not so limited and plenum 44 can be formed in any suitable manner as will occur to those of skill in the art, including being formed by a separate dedicated structure (not shown) or being formed by one or more of upper manifold member 28, lower manifold member 24 or other members in manifold 20.

While the upper 56 and side walls 60 of runners 48 are formed in upper manifold member 28, the lower wall 64 of runner 48 is formed by sliders 40. As can be seen in FIGS. 2a and 2b, sliders 40 are pivotally mounted to intermediate member 32 by pivot pins 68 such that sliders 40 can move between the maximum open position, shown in FIG. 2a and the minimally open position, shown in FIG. 2b. It is further contemplated that, in some configurations, intermediate member 32 may be omitted altogether and pivot pins 68, or their equivalent, can be mounted to upper manifold member 28 or lower manifold member 24.

An actuator for sliders 40 is best seen in FIG. 3. The actuator comprises a servo 72, which can be a vacuum servo, an electric servo motor or the like, that rotates an actuating rail 76 which extends through manifold 20 and, in the illustrated example, across intermediate member 32. Each slider 40 is connected to actuating rail 76 via a linkage 78, best seen in FIGS. 2a and 2b, such that rotation of actuating rail 76 moves sliders 40, about pivot pins 68, between the fully open position of FIG. 2a and the minimally open position of FIG. 2b.

While the embodiment described above includes slider assemblies 36 comprising two or more sliders 40 which are, effectively, ganged together, the present invention is not so limited and sliders 40 can be individually operated, to the same or different extents, by linkages 78.

In particular, it is contemplated that in some circumstances runners 48 may have different geometries within manifold 20, to accommodate particular packaging limitations for manifold 20. In such a case, sliders 40 may have different shapes and/or geometries as required for each different runner 48 and linkage 78 can be designed to move sliders 40 by different amounts and/or to different extents, as required.

As mentioned above, the performance of tunable inlet manifolds can be compromised by unsealed "leaks" in the runners which permit unintended airflows within and around the runners. Accordingly, in the present invention sliders 40 are preferably provided with seals 80 to reduce or eliminate leaks around sliders 40 in runner 48.

Figure 4:
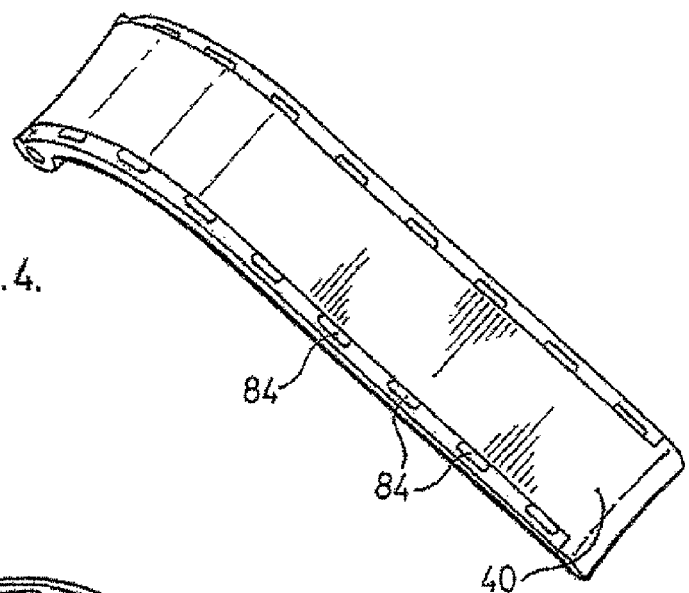
FIG. 4 shows a slider of the manifold before a seal is overmolded onto the slider.
Figure 5:
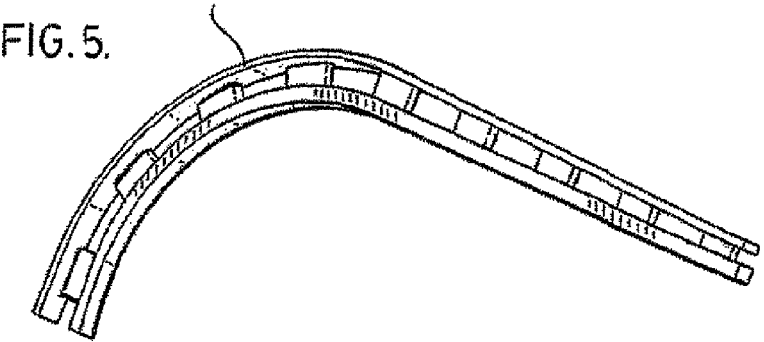
FIG. 5 shows a seal which is overmolded on the slider of FIG. 4.

In a presently preferred embodiment of the present invention, shown in FIG. 4, sliders 40 are molded from an engineering thermoplastic material, such as glass reinforced polyamide, and preferably include a series of slots 84 adjacent the edges of slider 40. Seals 80, best seen in FIG. 5, are attached to sliders 40, preferably by overmolding, from a flexible material and, preferably, a somewhat elastomeric material, such as FPM (Viton™), EPDM, FVMQ, or HNBR, etc. onto sliders 40 to form the assembly of the seals 80 and sliders 40, seen in detail in FIG. 6.

Figure 6:
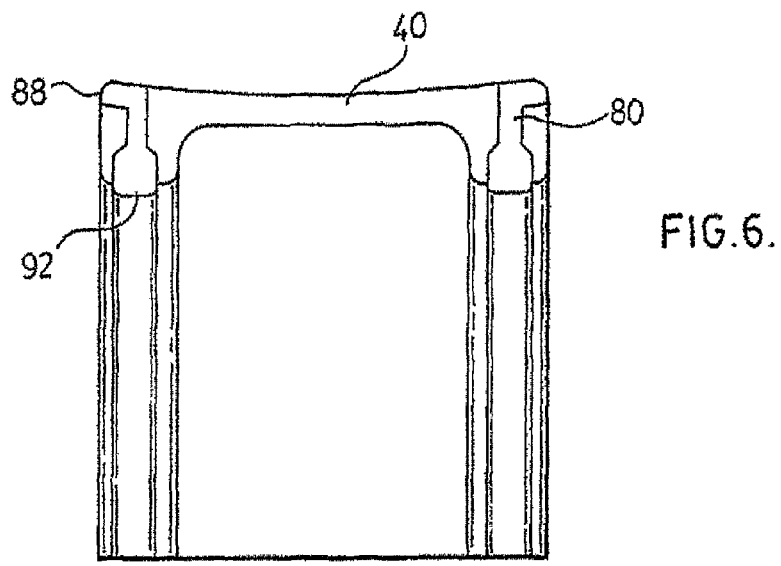
FIG. 6 shows a cross section through a slider of FIG. 1.

As shown in FIG. 6, seals 80 comprise a side seal portion 88 to seal slider 40 between the side walls 60 of runners 48 and a bottom seal portion 92 to seal slider 40 against the upper surface of intermediate member 32 when slider 40 is in the fully open position.

It is contemplated that in other configurations, seals 80 can include a single sealing surface to seal slider 40 both with respect to side wall 60 and intermediate member 32. It is further contemplated that seal 80 can also include a sealing surface to seal slider 40 at pivot pin 68, if necessary, or that an additional seal can be provided for such purpose either on slider 40 or on an adjacent portion of runner 48.

Figure 7:
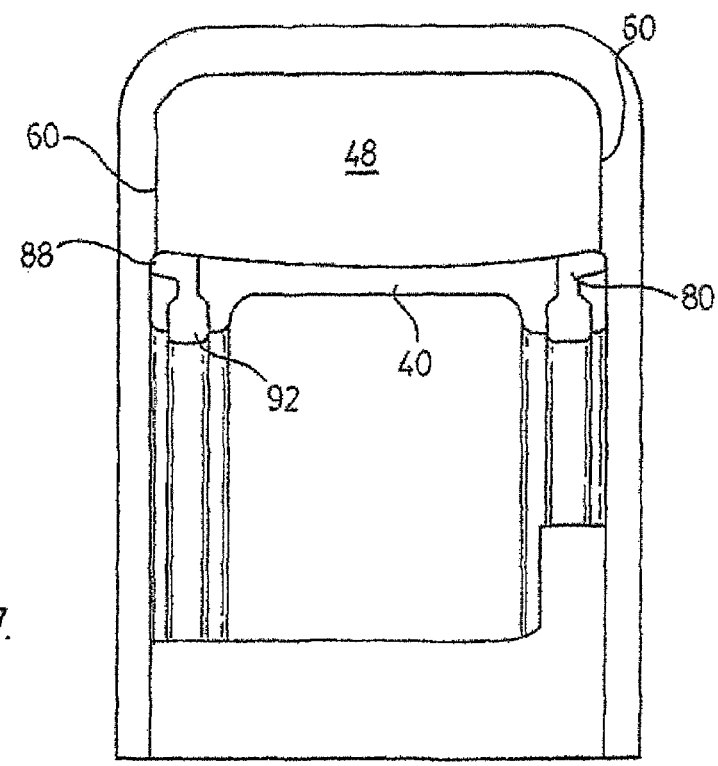
FIG. 7 shows a cross section of a slider and runner of the manifold of FIG. 1 with the slider in the minimally open position of FIG. 2b.
Figure 8:
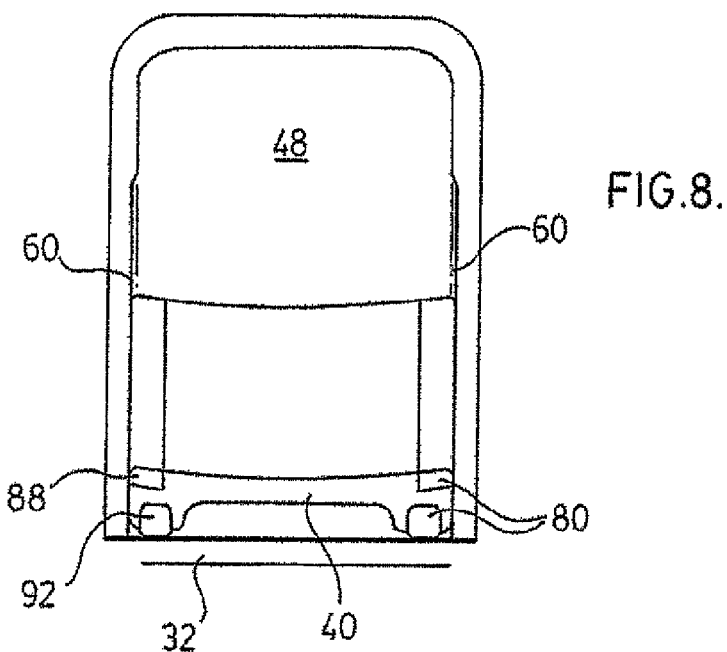

FIG. 7 shows the seal formed between side seal portions 88 and side walls 60 of runners 49 and FIG. 8 shows the seal formed between bottom seal portion 92 and the upper surface of intermediate member 32.

As will now be apparent, air is introduced to plenum 44 and this air enters runners 48 which guide it to manifold mounting flanges 52. As the operating conditions and/or speed of the engine changes, an engine control unit (ECU) or other control mechanism operates servo 72 to move actuating rail 76 which, in turn, moves sliders 40 to alter the cross sectional area of runners 48. By selecting an optimal cross section area of runners 48, the performance of the engine can be improved.

Manifold 20 can be employed with two-step strategies, wherein sliders 40 are only moved between the maximum open position and the minimally open position, or multi-step strategies wherein sliders 40 can be placed in a variety of intermediate positions in runners 48 between the maximum open position and the minimally open position or with infinitely variable strategies wherein sliders 40 can be continuously adjusted as needed.

The present invention is believed to provide a tunable inlet manifold which can be manufactured in a cost effective manner. More particularly, the present invention is believed to provide a tunable inlet manifold which makes very efficient use of its volumetric area, reducing the amount of volume which would otherwise be required in the engine compartment if a prior art tunable inlet manifold was employed. In the illustrated embodiment, the vertical height of manifold 20 is substantially lower than a prior art variable length tunable manifold previously used with the engine.

It is also believed that the seals 80 on sliders 40 provide an efficient means to seal runners 48 to prevent undesired leaks within runners 48. While not required by the present invention, it is believed that the overmolding of the seals onto sliders 40 provides a cost effective and mechanically effective manner of providing the desired seals between runners 48 and sliders 40.

Figure 9:
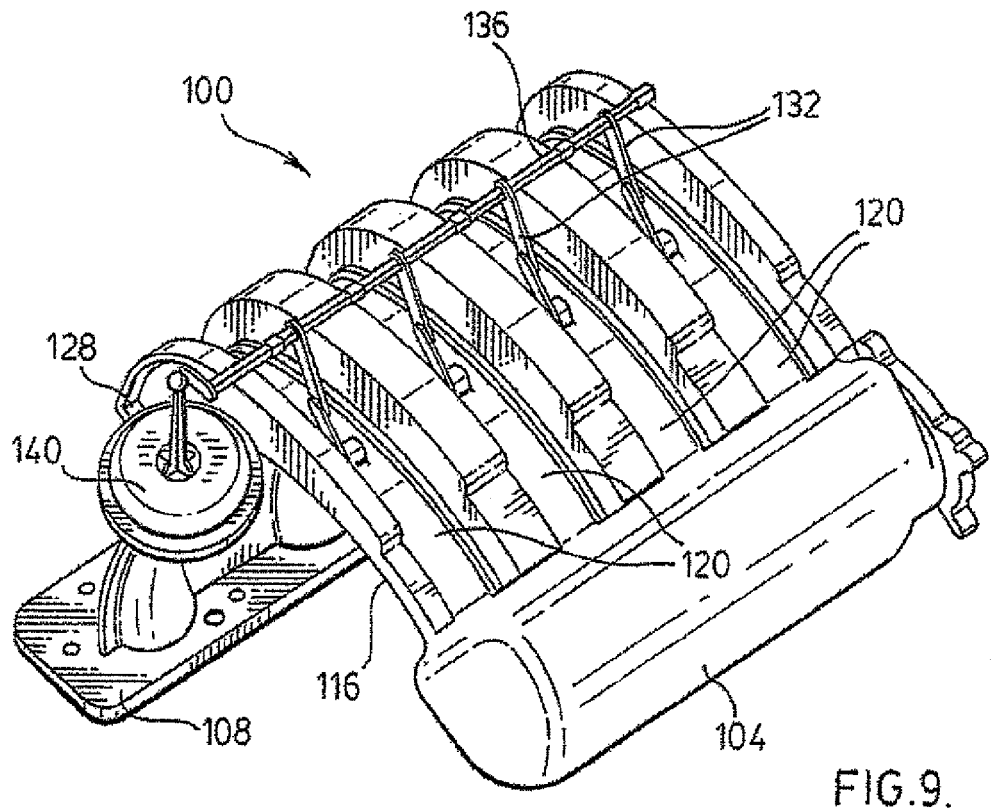
FIG. 9 shows a perspective view of the top and front of another inlet manifold in accordance with the present invention, wherein the upper manifold member has been removed from the Figure.
Figure 10:
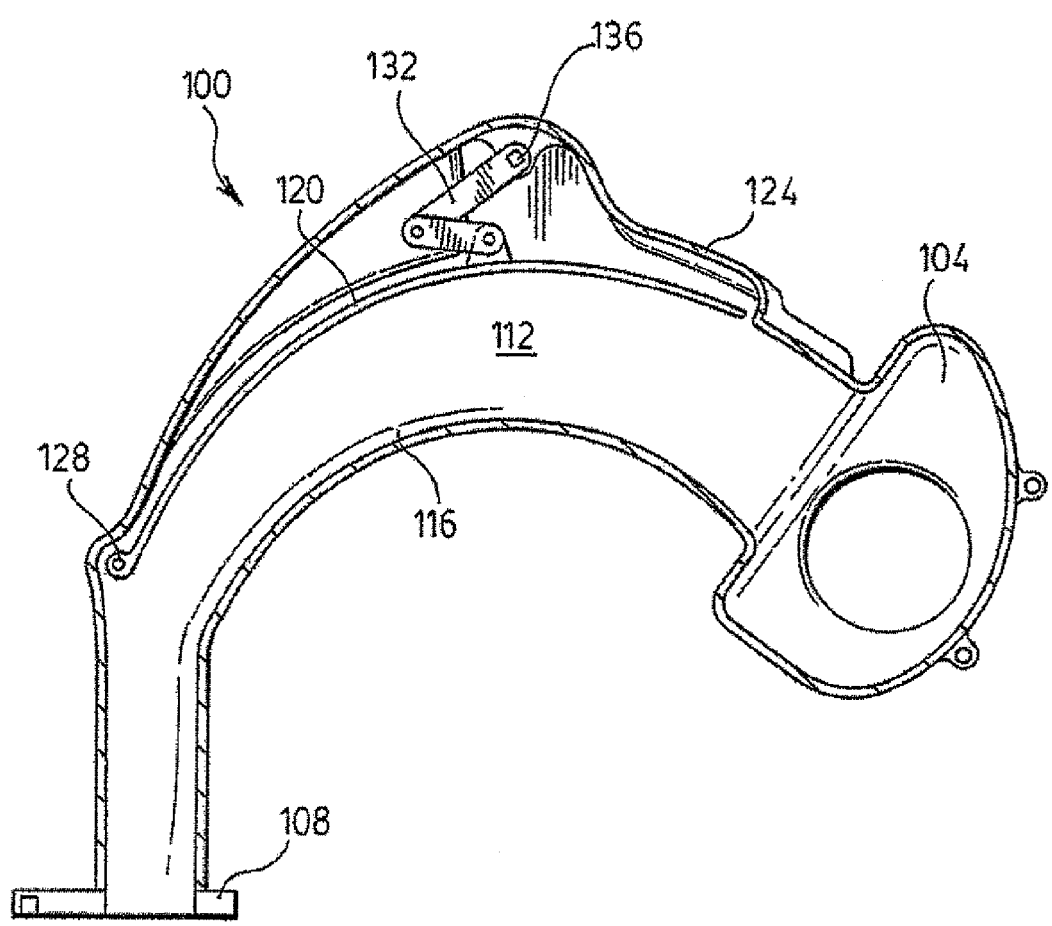
FIG. 10 shows a cross sectional view through an inlet runner of the manifold of FIG. 9 with the slider in the maximum open position.
Figure 11:
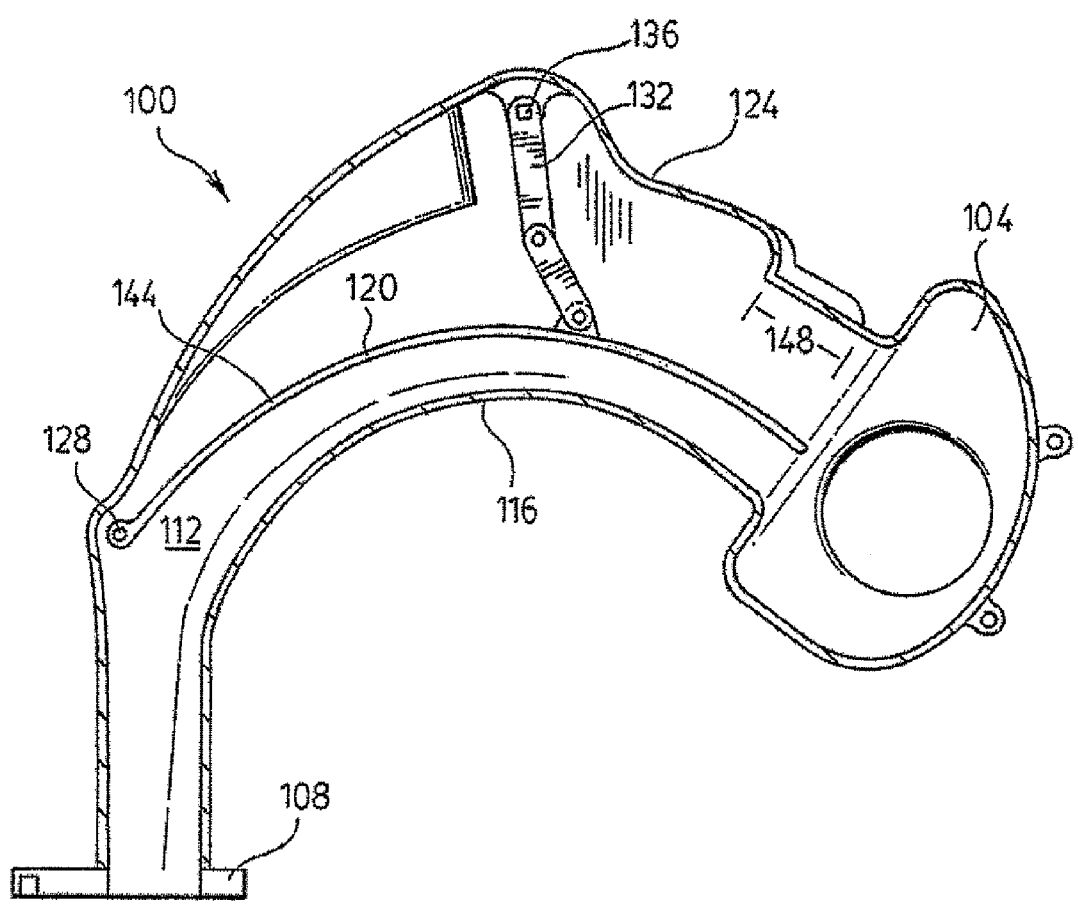
FIG. 11 shows a cross sectional view through an inlet runner of FIG. 10 with the slider in the minimally open position.

Another embodiment of a manifold 100 in accordance with the present invention is shown in FIGS. 9, 10 and 11. Manifold 100 is an inlet manifold for an inline engine, in this particular case an inline four cylinder engine. As shown, manifold 100 includes an air plenum 104, a manifold mounting flange 108 and four runners 112 (best seen in FIGS. 10 and 11) extending therebetween. In this embodiment, runners 112 comprise bottom and side walls formed from lower manifold member 116 and sliders 120, which are connected to an upper manifold member 124 by pivots 128, enclose runners 112.

Sliders 120 are moved between maximally opened (shown in FIG. 10) and minimally opened (shown in FIG. 11) positions by a linkage 132 which is operated by an actuating rod 136. An actuator 140, which can be any suitable actuator such as an electric servo motor or a vacuum actuator, rotates actuating rod under the control of an ECU or other device, to move sliders 120 to alter the cross section of runners 112 as desired.

In this embodiment, sliders 120 include seals 144 with sealing portions to seal sliders 120 with respect to the sidewalls of runners 112, but need not include sealing portions to seal sliders 120 with respect to upper manifold member 124 at the end of runners 112 adjacent plenum 104, as the relatively large contact area 148 over which sliders 120 abut upper manifold member 124 when in the maximally opened position can provide sufficient sealing and/or the relatively small volume between sliders 120 in the maximally opened position and upper manifold member 124 effectively acts to seal runner 112 without the need for a sealing portion. However, such additional sealing portions can be provided if desired, or required, and seals 144 are preferably overmolded onto sliders 120, as discussed above.

While much of the discussion above has related to the use of the present invention for the inlet side of internal combustion engines, it is also contemplated that the present invention can also be advantageously employed on the exhaust side of internal combustion engines. Specifically, exhaust manifolds can be tuned to enhance the scavenging of exhaust gases from the engine cylinders into the exhaust system. Such tuning typically involves carefully designing the size, length and shape of the exhaust headers in the manifold and the point at which they are merged into the exhaust pipe. However, as with the inlet manifolds described above, the optimal tuning design for the exhaust manifold is dependent upon the operating speed of the engine and thus the tuning can only be performed for a selected engine operating speed and compromises are required for other operating conditions.

With the present invention, it is contemplated that the exhaust manifold can include sliders, similar to sliders 120, which can alter the cross sectional area of the exhaust headers in the manifold under control of the engine ECU or other control system, to provide enhanced scavenging of exhaust gases from the engine cylinders over a wider range of operating conditions.

FIGS. 12, 13, 14 and 15 show another embodiment of a manifold 200 in accordance with the present invention. Specifically, manifold 200 is an inlet manifold designed for a sixty degree V6 engine. Manifold 200 includes a main body 204 which, together with a cover (not shown) defines a generally U-shaped plenum 208 which extends from an air inlet 212.

As with manifold 20 and manifold 100, discussed above, manifold 200 further includes a series of six runners 216 (best seen in FIG. 13) each of which extend between plenum 208 and an inlet port mounting plate 220 which attaches manifold 200 to the respective inlet ports of the engine.

Each runner 216 includes a top wall and two side walls formed by main body 204 and a slider 224 which forms the fourth, moveable, wall of runners 216. As before, each slider 224 preferably includes seals 226 (best seen in FIG. 14) acting between slider 224 and the side walls to inhibit unintended air flows around slider 224.

Figure 14:
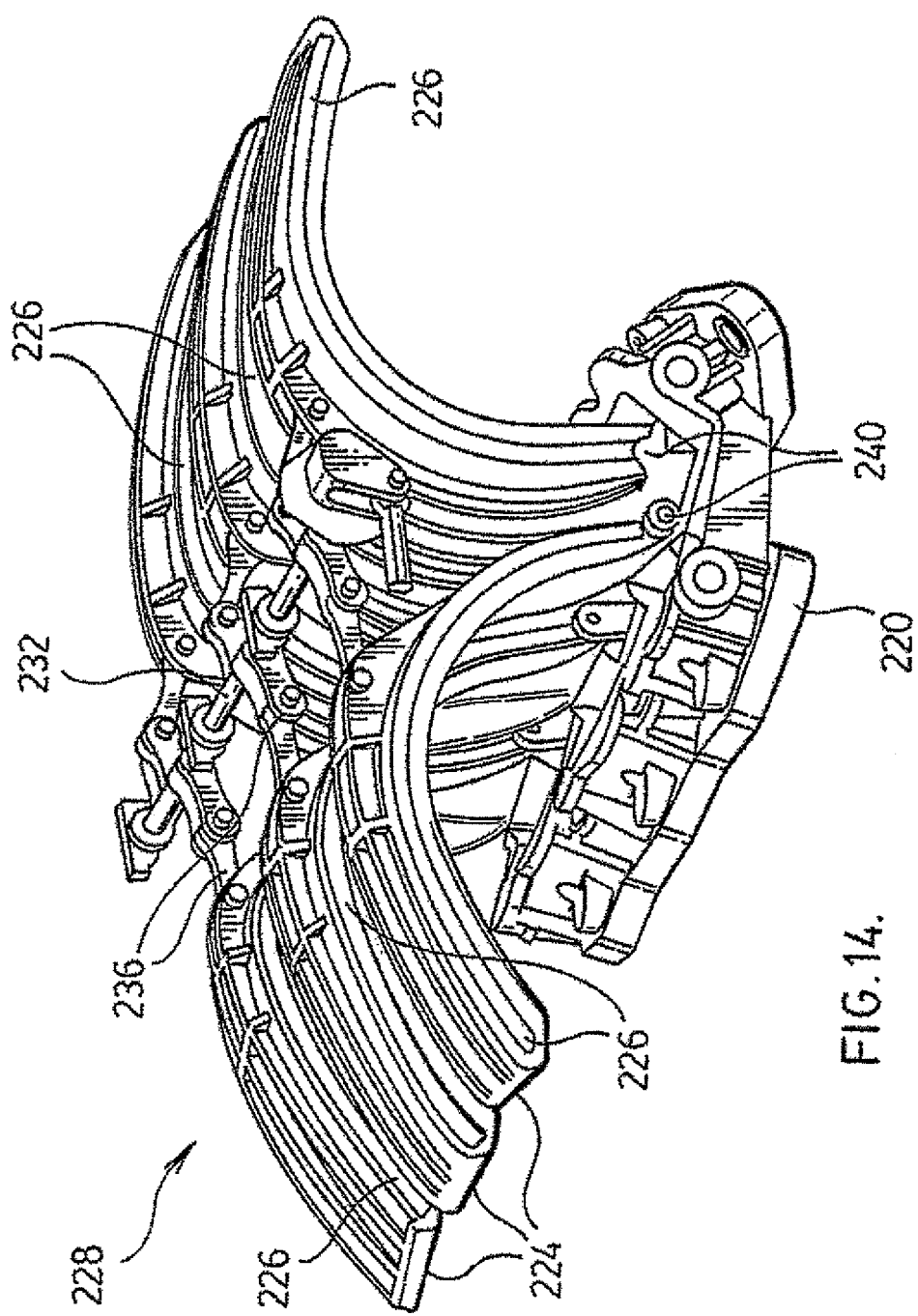
FIG. 14 shows a slider assembly employed in the manifold of FIG. 12.

As best seen in FIG. 14, wherein slider assembly 228 is shown, each slider 224 is connected to a control shaft 232 via a respective control linkage 236 such that rotation of control shaft 232 moves sliders 224 about respective pivots 240 on inlet port mount plate 220. The pivoting of sliders 224 in runners 216 changes the area of runners 216.

Control shaft 232 can be rotated by any suitable mechanism (not shown), such as a DC motor or a vacuum actuator, under the control of an ECM or other suitable control device, to vary the area of runner 216 as needed for the operating parameters of the engine on which manifold 200 is installed.

One of the particular problems with V6 engines is that, at certain engine operating speeds, a resonance condition can occur in the inlet manifold between one bank of three inlet runners and the other bank of three inlet runners. One conventional solution to mitigate this resonance condition, which negatively impacts engine performance, is to provide a crossover between each bank of three runners. Such crossovers are generally provided with a valve which is moved between a closed position and an open position by an actuator to cross connect or isolate the two banks of runners when necessary to control resonance.

Figure 12:
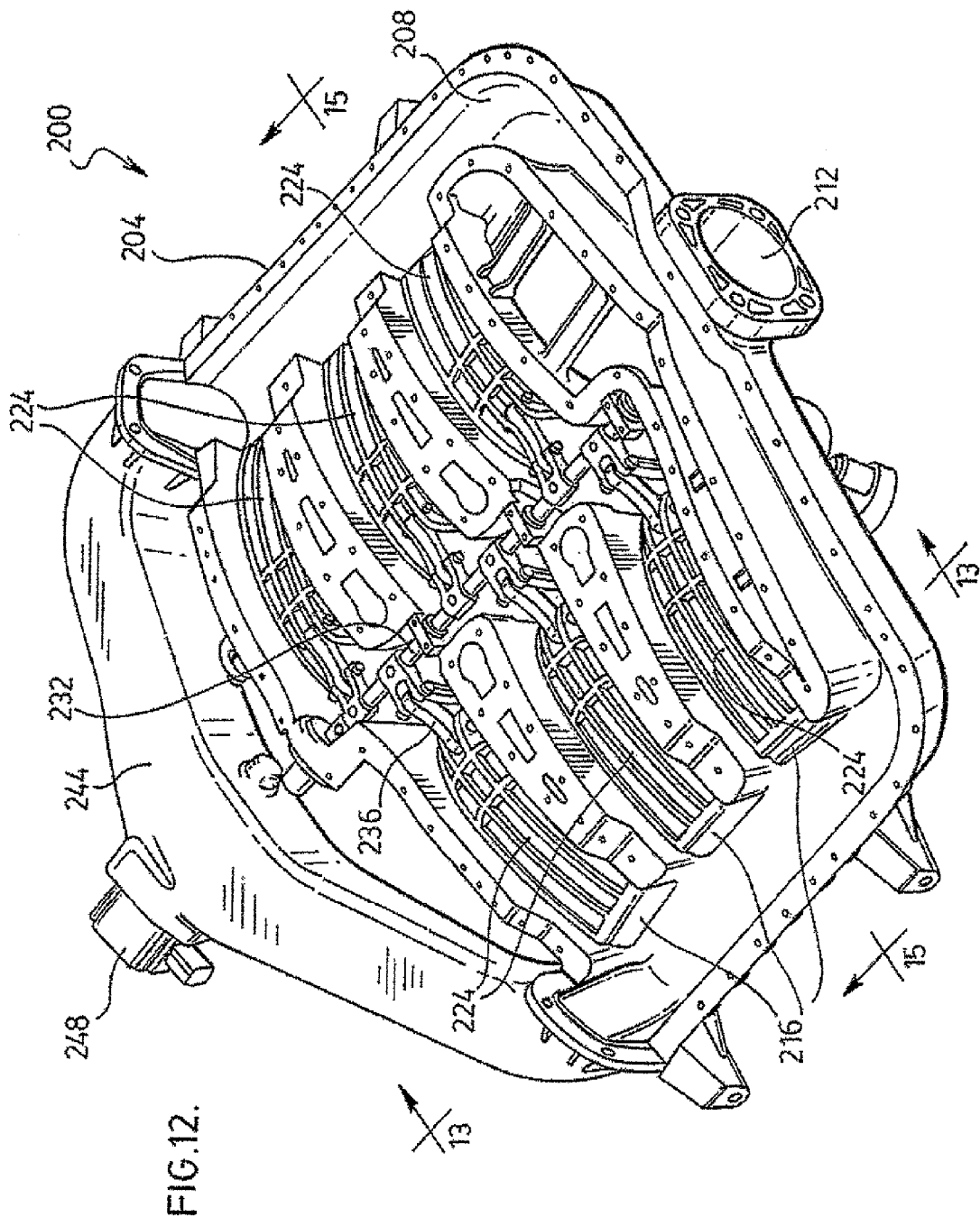
FIG. 12 shows a top perspective view of another inlet manifold in accordance with the present invention.
Figure 13:
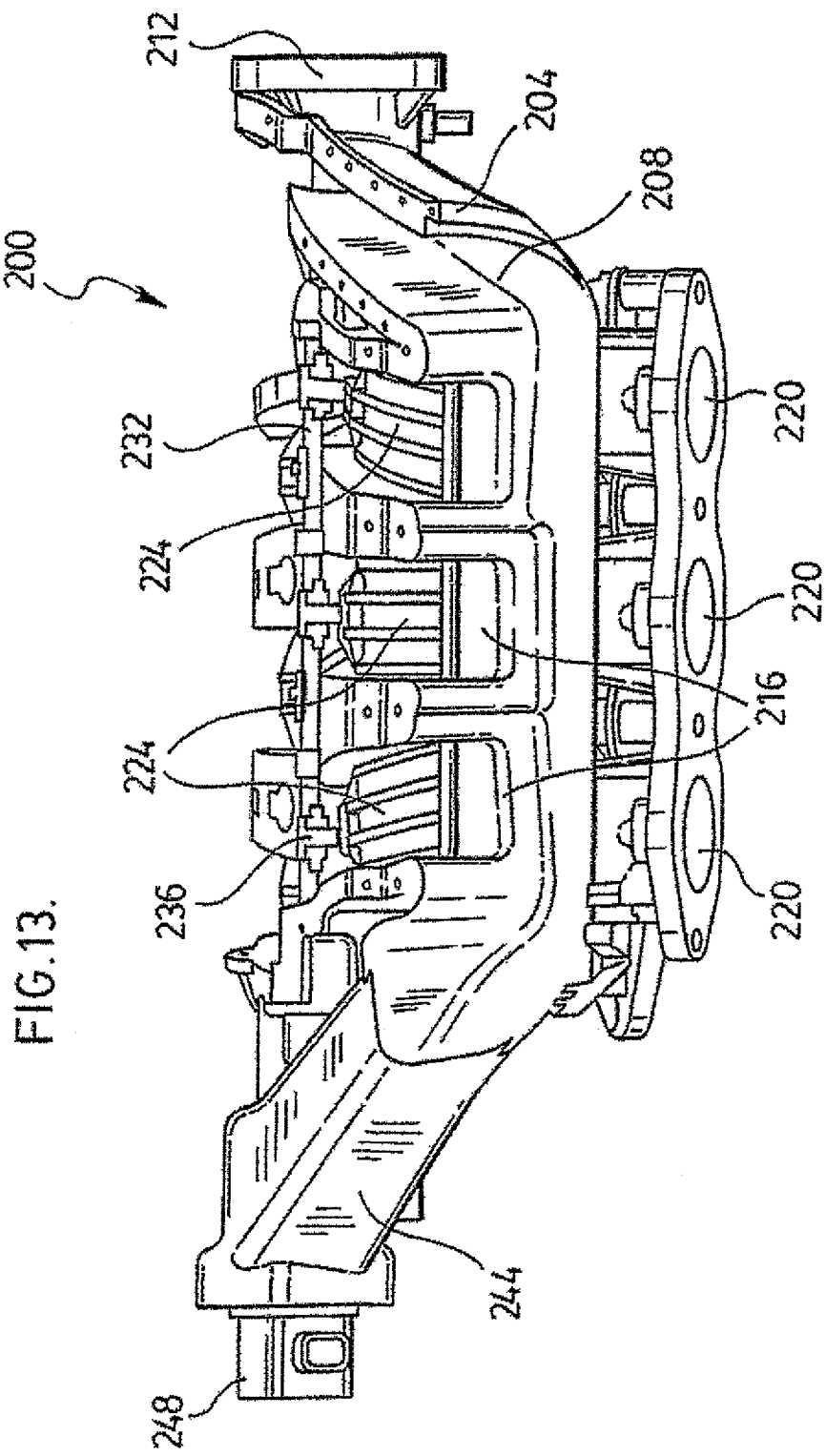
FIG. 13 shows a cross section, taken along line 13-13 of FIG. 12.

In the illustrated embodiment of FIGS. 12, 13 and 14, a conventional crossover 244 is provided to interconnect the two arms of U-shaped plenum 208 and an actuator 248 can move a valve within crossover 244 between open and closed positions.

While such crossovers do work, they also suffer from disadvantages, particularly in that they occupy a significant volume which may be difficult to provide in some engine compartments.

It is contemplated that, with the present invention, such crossover functionality can be provided without the need for a separate crossover member. Specifically, as illustrated in FIG. 15, crossover connections between the two banks of three runners 216 can be provided through the passages formed over the sides of sliders 224 opposite the sides forming runners 216, as indicated by arrow 250.

If required, a valve (not shown) can be included on control shaft 232, or on a separate shaft, to open and close the crossover connections between the banks of runners 216 under differing operating conditions.

As will be apparent to those of skill in the art, such crossover functionality can also be provided with exhaust manifolds in accordance with the present invention, either between banks of runners or between individual runners in a single bank.

The above-described embodiments of the invention are intended to be examples of the present invention and alterations and modifications may be effected thereto, by those of skill in the art, without departing from the scope of the invention which is defined solely by the claims appended hereto.

We claim:

1. A tunable engine manifold for connecting to an internal combustion engine, comprising:
    a set of runners, each runner connecting to a port of a cylinder of the engine;
    a set of sliders, each slider being pivotally mounted within a respective one of the runners such that rotational movement of the slider about the pivot alters the cross sectional area of the runner, wherein each slider further comprises a seal to seal the slider with respect to the runner; and
    a slide actuator being operable to pivot the sliders within the runners.

2. A tunable engine manifold according to claim 1 wherein the slider actuator comprises a rotatable rail to which each slider is connected via a linkage.

3. A tunable engine manifold according to claim 2 wherein the linkage is a bell crank mechanism.

4. A tunable engine manifold according to claim 1 wherein the seals are overmolded onto the sliders.

5. A tunable engine manifold according to claim 1 wherein the set of runners are molded from glass reinforced polyamide material.

6. A tunable engine manifold according to claim 1 further comprising an actuator to rotate the slide actuator.

7. A tunable engine manifold according to claim 6 wherein the actuator is an electric servo motor.

8. A tunable engine manifold according to claim 6 wherein the actuator is a vacuum servo.

9. A tunable engine manifold according to claim 1 wherein the sliders pivot about a pivot point attached to the manifold.

10. A tunable engine manifold according to claim 9 wherein the pivot point is at a downstream end of the slider.

11. A tunable engine manifold according to claim 1 wherein the manifold is an inlet manifold.

12. A tunable engine manifold according to claim 11 wherein the manifold extends between an air plenum and inlet ports of the engine.

13. A tunable engine manifold according to claim 12 wherein the engine is a V configuration engine and the runners are arranged in two banks, the manifold further including a crossover extending over the sliders between the banks of runners.

14. A tunable engine manifold according to claim 13 further comprising a moveable valve to open and close the crossover as desired.

15. A tunable engine manifold according to claim 1 wherein the manifold is an exhaust manifold.

16. A tunable engine manifold according to claim 15 wherein the manifold extends between an exhaust collector and exhaust ports of the engine.

17. A tunable engine manifold according to claim 16 wherein the exhaust collector acts to merge exhaust gases from two or more runners into an exhaust pipe.

18. A slider assembly for a tunable engine manifold, comprising:
    a mounting member for mounting the assembly to an engine manifold, a set of sliders pivotally attached to the assembly, each slider forming one wall of a respective runners of the manifold such that rotational pivotal movement of the sliders alters the area of the runners, wherein each slider further comprises a seal to seal the slider with respect to the runner;
    a slider actuator connected to the sliders such that movement of the slider actuator pivots the sliders in the runners; and
    an actuator to move the slider actuator.

19. A tunable engine manifold for connecting to an internal combustion engine, comprising:
    a set of runners, each runner connecting to a port of a cylinder of the engine;
    a set of sliders, wherein each slider has a downstream end and is pivotally mounted at the downstream end within a respective one of the runners for rotational movement between a first position and a second position, such that movement of the slider about the pivot alters the cross sectional area of the runner and wherein when the slider is at the first position and when the slider is at the second position the respective one of the runners is substantially free of discontinuous changes in cross-sectional size at the downstream end of the slider; and
    a slide actuator being operable to pivot the sliders within the runners.

* * * * *